United States Patent
Onderko et al.

(10) Patent No.: US 7,336,177 B2
(45) Date of Patent: Feb. 26, 2008

(54) RFID SYSTEM AND METHOD FOR TRACKING INDIVIDUAL ARTICLES

(75) Inventors: John C. Onderko, Appleton, WI (US);
Michael D. O'Shea, Neenah, WI (US);
Gary A. Clement, Menasha, WI (US);
Brad W. Reiser, Neenah, WI (US);
Reed C. Eppelheimer, Okemos, MI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/212,318

(22) Filed: Aug. 25, 2005

(65) Prior Publication Data

US 2007/0046464 A1    Mar. 1, 2007

(51) Int. Cl.
*G08B 13/14* (2006.01)

(52) U.S. Cl. .................. 340/572.1; 340/10.1; 235/385; 700/221; 700/224

(58) Field of Classification Search .. 340/572.1–572.8, 340/10.1; 700/215, 221–225, 227–229; 235/375–385; 705/22, 28, 29
See application file for complete search history.

(56) References Cited

U.S. PATENT DOCUMENTS

| | | | | |
|---|---|---|---|---|
| 3,482,712 A | * | 12/1969 | Powers ...................... 414/273 |
| 3,836,755 A | * | 9/1974 | Ehrat ......................... 235/383 |
| 4,850,473 A | * | 7/1989 | MacWilliams et al. .. 198/463.6 |
| 5,006,996 A | * | 4/1991 | Nakamura et al. .......... 700/215 |
| 5,038,283 A | * | 8/1991 | Caveney ....................... 705/28 |
| 5,216,618 A | * | 6/1993 | Arita et al. .................. 700/215 |
| 5,260,694 A | * | 11/1993 | Remahl ....................... 340/674 |
| 5,774,876 A | * | 6/1998 | Woolley et al. ............... 705/28 |
| 5,787,687 A | | 8/1998 | Mueller et al. |
| 6,335,685 B1 | | 1/2002 | Schrott et al. |
| 6,600,418 B2 | * | 7/2003 | Francis et al. ........... 340/572.1 |
| 6,662,068 B1 | * | 12/2003 | Ghaffari ..................... 700/115 |
| 6,728,597 B2 | * | 4/2004 | Didriksen et al. .......... 700/243 |
| 6,750,769 B1 | | 6/2004 | Smith |
| 6,765,476 B2 | | 7/2004 | Steele et al. |
| 6,765,484 B2 | * | 7/2004 | Eagleson et al. ........... 340/505 |
| 6,845,909 B2 | * | 1/2005 | Bong et al. ................. 235/385 |
| 6,895,301 B2 | * | 5/2005 | Mountz ...................... 700/215 |
| 6,919,803 B2 | * | 7/2005 | Breed .................... 340/539.14 |

(Continued)

OTHER PUBLICATIONS

"Smart Carts Promise to Take the Drudgery out of Shopping," Internet web page "http://www.sum.com/br/1004_ezine/ret_cart.html", Sun Microsystems, Inc., Oct. 2004, 3 pages.

(Continued)

*Primary Examiner*—Benjamin C. Lee
(74) *Attorney, Agent, or Firm*—Denise L. Stoker; Alyssa A. Dudkowski (57) ABSTRACT

A RFID related system and method for tracking articles that are not individually labeled with RFID tags. A transporter with an RFID reader identifies a carrier with an RFID tag as it is disposed onto the transporter. The location and/or number of the disassociated articles, once removed or otherwise disassociated with the carrier are transmitted to a computer on the transporter. Tagged carriers that continue to have articles associated therewith are removed from the transporter and placed back into storage. The computer may transmit data regarding the carrier and articles to a database.

17 Claims, 3 Drawing Sheets

U.S. PATENT DOCUMENTS

| | | | |
|---|---|---|---|
| 7,142,124 B2* | 11/2006 | Chi et al. | 340/612 |
| 2001/0041948 A1* | 11/2001 | Ross et al. | 700/226 |
| 2002/0180603 A1 | 12/2002 | Lyle | |
| 2003/0155415 A1 | 8/2003 | Markham et al. | |
| 2003/0174099 A1 | 9/2003 | Bauer et al. | |
| 2004/0036595 A1 | 2/2004 | Kenny et al. | |
| 2004/0074964 A1* | 4/2004 | Falkenrich-Wesche | 235/385 |
| 2004/0245332 A1 | 12/2004 | Silverbrook et al. | |
| 2005/0006469 A1* | 1/2005 | Nonneman et al. | 235/384 |
| 2006/0020366 A1* | 1/2006 | Bloom | 700/226 |

OTHER PUBLICATIONS

Lindsay, Jeffrey D. et al., "Retail RFID Systems Without Smart Shelves," Article 21114D on IP.com, available at Internet web page "https://priorart.ip.com/viewPub.jsp?pubID=IPCOM000021114D", Dec. 23, 2003, 14 pages.

Moozakis, Chuck, "Cannon Adding RFID to Carts," *Newspaper & Technology*, Internet web page "http://www.newsandtech.com/issues/2005/05-05/nt/05-05_cannonrfid.htm", May 2005, 2 pages.

Patent Cooperation Treaty Search Report from the International Search Authority, International Application No. PCT/US 06/25863 dated Sep. 27, 2007.

* cited by examiner

RFID SYSTEM AND METHOD FOR TRACKING INDIVIDUAL ARTICLES

TECHNICAL FIELD

Embodiments of the present invention relate to the field of article identification and tracking. In particular, embodiments of this invention relate to tracking data-tagged carriers associated with individual articles that do not have data-tags.

BACKGROUND OF THE INVENTION

Data tag technology such as radio frequency identification (RFID) technology refers to passive smart tags (miniature antenna-containing tags requiring no internal power supply) that may be embedded in or attached to a product or material to convey information that may be read by a scanner. Generally, conductive or passive smart tags include a data circuit and an antenna. In particular, smart tags include a semiconductor, a coiled, etched, or stamped antenna, a capacitor, and a substrate on which the components are mounted or embedded. A protective covering is typically used to encapsulate and seal the substrate.

In general, RFID systems and other data tag systems include readers and tags in which the tags generate an electromagnetic response to an electronic signal from a reader. The response signal is read by the reader, typically with a readable range on the order of a few feet, though broader or narrower ranges are possible. The signal generated by the tag includes information (e.g., an electronic product code) that identifies the tag or the article comprising the tag.

RFID technology for use in the supply chain typically involves the use of portals through which goods must pass. The portals are equipped with RFID readers that can read the RFID tags on the pallets, cases, or individual items that pass through the portal. For example, a carrier or case of articles may pass from a storage area, through a portal and to out to a retail space to be placed on shelves. An RFID reader at the portal will detect when the case passes from the storage area to the retail space. However, if the case is not completely emptied onto a shelf, unused articles left in the case will pass once again through the portal when the case is returned to the storage area. Since the case and not each individual article carries the RFID tag, there is no way to tell how many articles are left in storage or how many articles were placed in the retail space.

One solution is to place an RFID tag on each article in a case so that the portal can detect how many articles leave and return to the storage area. However, until data tag technology becomes more widespread, this solution is cost prohibitive in the current competitive environment.

Accordingly, a system and method is needed that facilitates the tracking of individual articles that are not individually tagged with RFID or other data tags.

SUMMARY OF THE INVENTION

A computer-implemented method for determining the location of an article within a defined environment is presented. A transporter comprising a mobile platform is provided, the transporter including a data tag reader adapted to interrogate a tagged carrier. The data tag reader is interfaced to a computer. A tagged carrier is placed onto the transporter, the tagged carrier associated with at least one non-tagged article. At least one non-tagged article is disassociated from the tagged carrier. The act of disassociation is communicated to the computer.

In another aspect of the invention, a computer-implemented method for determining the location of an article within a defined environment is presented. Provided is a transporter comprising a mobile platform and a data tag reader that is interfaced to a computer database. A disposing a tagged carrier is placed onto the transporter, the tagged carrier associated with at least one non-tagged article. The tagged carrier is interrogated by the data tag reader, and resulting carrier data is transmitted to the computer. At least one non-tagged article is dissociated from the tagged carrier, and the act of dissociation communicated to the computer. Further communicated to the computer is the location of all non-tagged articles disassociated from the transporter.

In yet another aspect of the invention, a system for locating an article within a defined setting is presented. A transporter has compartments adapted to separate and carry RFID-tagged containers containing non-RFID-tagged articles. A tag reader is attached to the transporter for communicating electronic RFID data to a computer. The transporter includes at least one antenna configured to receive and transmit data for each compartment to the computer via the reader. The computer is adapted to transmit data regarding the location of the non-RFID-tagged articles and the tagged containers to a database.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Reference will now be made in detail to one or more embodiments of the invention, examples of which are graphically illustrated in the drawing(s). Each and every example and embodiment are provided by way of explanation of the invention, and not meant as a limitation of the invention. For example, features illustrated or described as part of one embodiment may be utilized with another embodiment to yield still a further embodiment. It is intended that the present invention include these and other modifications and variations.

Figure 1:
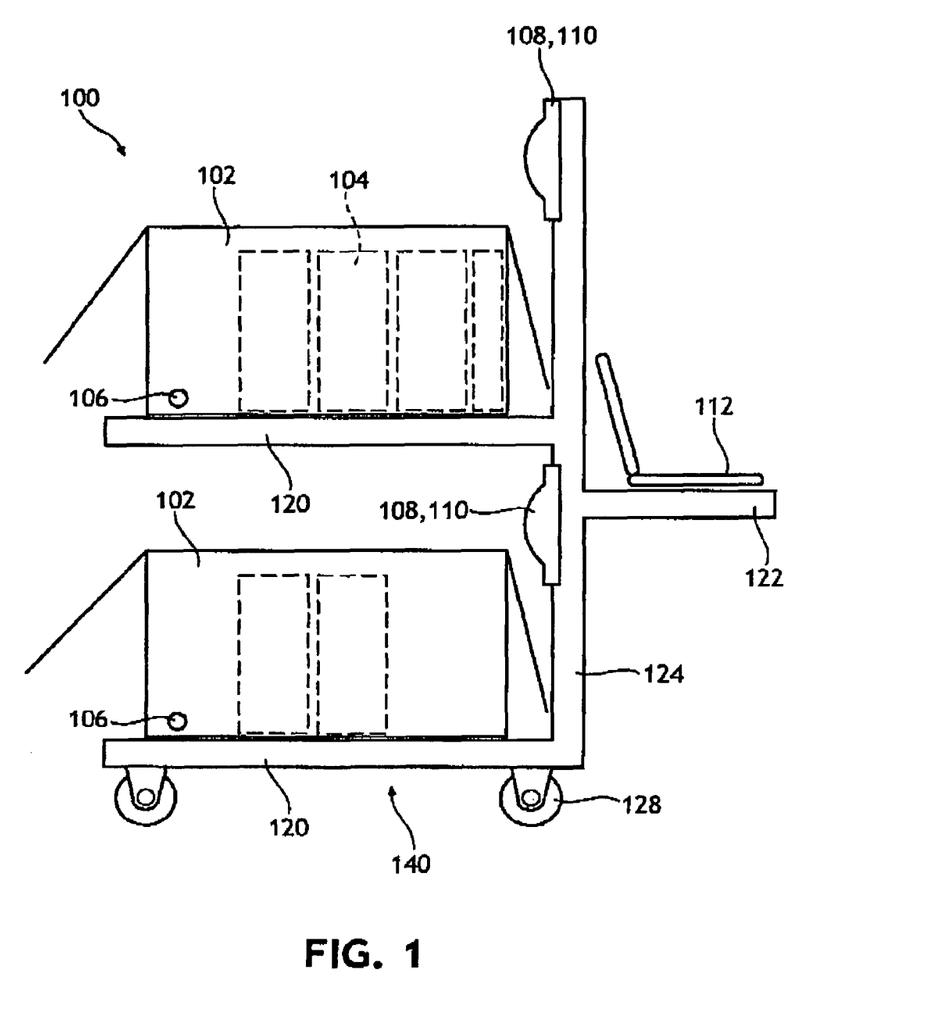
FIG. 1 is a side elevation view of an exemplary system according to one embodiment of the present invention.

Referring now to FIG. 1, illustrated in one embodiment is a system for carrying out the method of the present invention. In general, a transporter 100 is used to convey carriers 102 to different locations within a defined environment, for instance, a retail store, manufacturing facility, farm, hospital, school, or any entity that benefits from keeping an inventory of tangible items. The carriers 102 either contain or are associated with one or more articles 104. Each carrier 102 has associated with it a data tag 106, such as an RFID tag. Transporter 100 includes a data tag reader 108 that may be in communication with one or more antennae 110. In one embodiment, the transporter further includes a computer 112 for data receipt and or entry from the data tag reader 108 and/or the user of the system. In yet another embodiment, the transporter may include a weighing device and/or a visual detector to assist with determining how many carriers 102 and/or articles 104 are being conveyed by transporter 100 at a given time.

A data tag, smart tag, or other identification means (e.g., a bar code) may be placed by hand or by machinery on an object or article, such as the carrier of the present invention as described herein. The data tag may be placed inside or outside of the carrier. The data tag stores identification information. In one embodiment, the information in the tag is used to assist in tracking the inventory of individual articles sold in a retail store. A data tag reader interrogates a data tag affixed to a carrier.

While some embodiments of the invention are described herein as being operable with radio frequency identification (RFID) systems, the invention is operable with any data tag means and data tag reader means. That is, the invention is not limited to RFID.

RFID smart tag technology is known and understood by those skilled in the art, and a detailed explanation thereof is not necessary for purposes of describing embodiments of the method and system according to the present invention. RFID systems for manufacturing are disclosed in commonly owned U.S. patent application Ser. No. 10/306,794, "Communication Between Machines and Feed-Forward Control in Event-Based Product Manufacturing," filed Nov. 27, 2002 by Markham et al., which is herein incorporated by reference to the extent that it is noncontradictory herewith.

In general, RFID chips may be read-only chips, which include a fixed electronic code, or they may be read-write chips, which allow new information to be added. The chips may also be associated with sensors to read sensor information and transmit a signal responsive to the information, such as a value from a biosensor. Exemplary smart tags including RFID technology associated with a sensor are the active labels of KSW Microtec (Dresden, Germany), including TEMPSENS® active smart labels for measuring and recording temperature.

RFID tags can take many physical formats, such as a microchip from 30 to 100 microns thick and from 0.1 to 1 mm across, joined to a minute metal antenna such as the Hitachi 2.45 GHz Mew chip. Another form is the "Coil-on-Chip" system from Maxell (Tokyo, Japan). Exemplary RFID vendors of tags and/or readers and associated systems include Intermec Technologies Corporation (Everett, Wash.), Symbol Technologies (Holtsville, N.Y.), AWID (Monsey, N.Y.), Philips Semiconductor (Eindhoven, The Netherlands), and Texas Instruments (Dallas, Tex.).

Readers may be separate units or be integrated into or added onto a laptop, a personal data assistant (PDA) device, a cellular phone, or other electronic device. Readers for use in the present invention may include any known variety, including multi-protocol readers (e.g., those of AWID) that scan multiple frequencies or that are adapted for reading a variety of RFID tags or other identification elements. Data tag readers may also be adaptive readers that adjust their scanning frequency, signal strength, and/or signal orientation or direction to improve signal obtained from the tag or tags being read. Readers that adapt their frequency are discussed, by way of illustration, in U.S. Pat. No. 6,765,476, "Multi-level RF Identification System," issued Jul. 20, 2004 to Steele, herein incorporated by reference to the extent it is noncontradictory herewith.

In general, transporter 100 is a mobile device that is capable of moving from one area to another. The transporter may be a wheeled cart, an automated guided vehicle, truck, shopping cart, etc. The transporter may be motorized or even remote controlled. A vast number of transporter configurations are within the spirit and scope of this invention. In the embodiments shown in FIGS. 1-3, transporter 100 may take the form of a cart that includes one or more platforms 120 for supporting one or more carriers 102. The transporter may include a computer shelf 122 for holding a computing device such as a wireless laptop or the like. Transporter 100 may include vertical supports 124 to support the platforms 120 and computer shelf 122 in a spaced apart manner. Platforms 120 may be perpendicular to vertical supports 124, or at a slight angle to prevent carriers from inadvertently sliding off transporter 100. The bottom-most platform 120 may also function as a base member 126 that supports the vertical supports 124. A plurality of wheels 128 or other devices that facilitate movement of the transporter 100 may be attached to the base member 126.

FIG. 1 further generally illustrates an embodiment of the present having multiple data tag readers, which may be desired depending on the specifications of the data tag readers. The general construction of the embodiment of FIG. 1 is described below.

Figure 2:
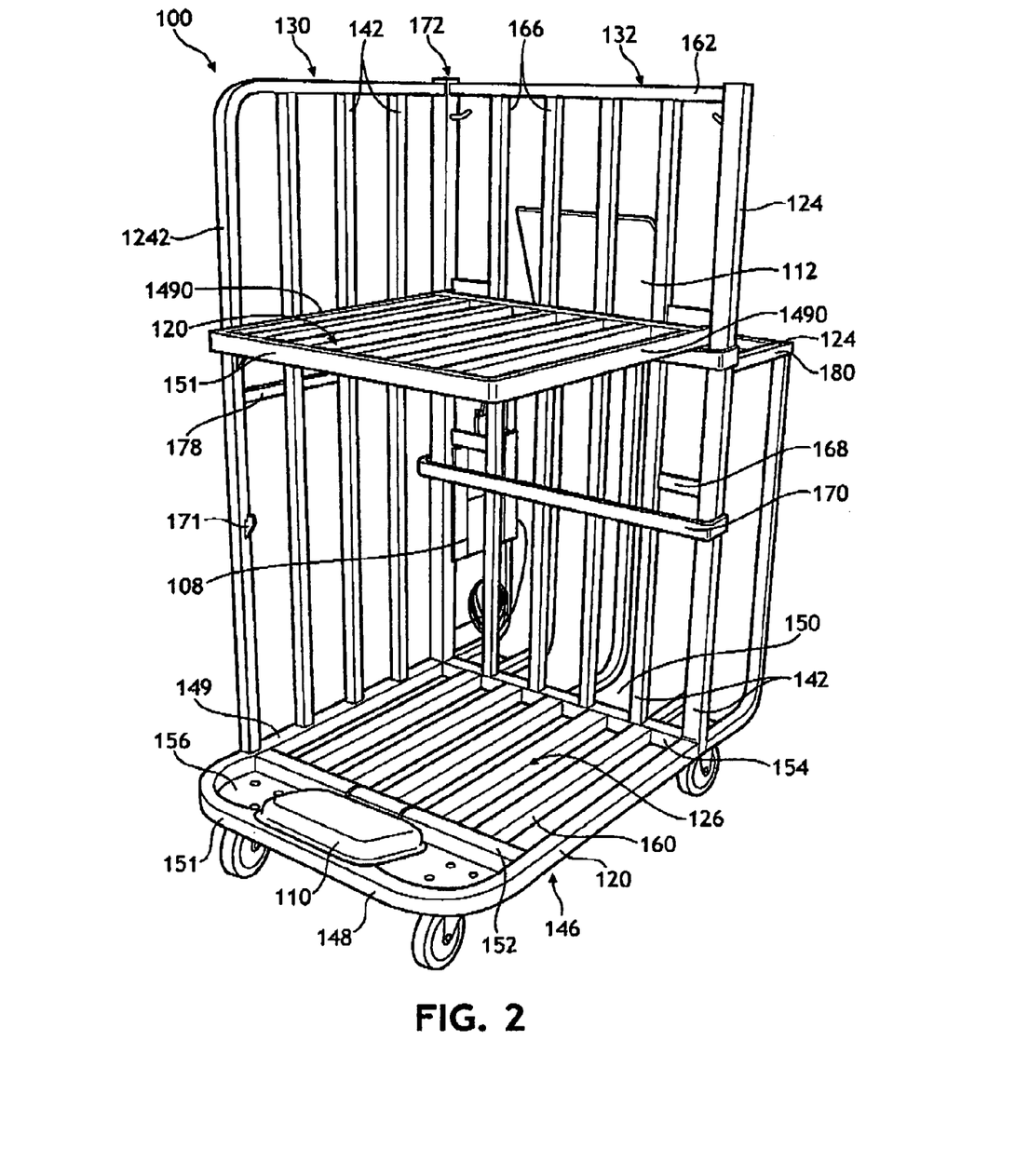
FIG. 2 is a front perspective view of an exemplary system according to another embodiment of the present invention.
Figure 3:
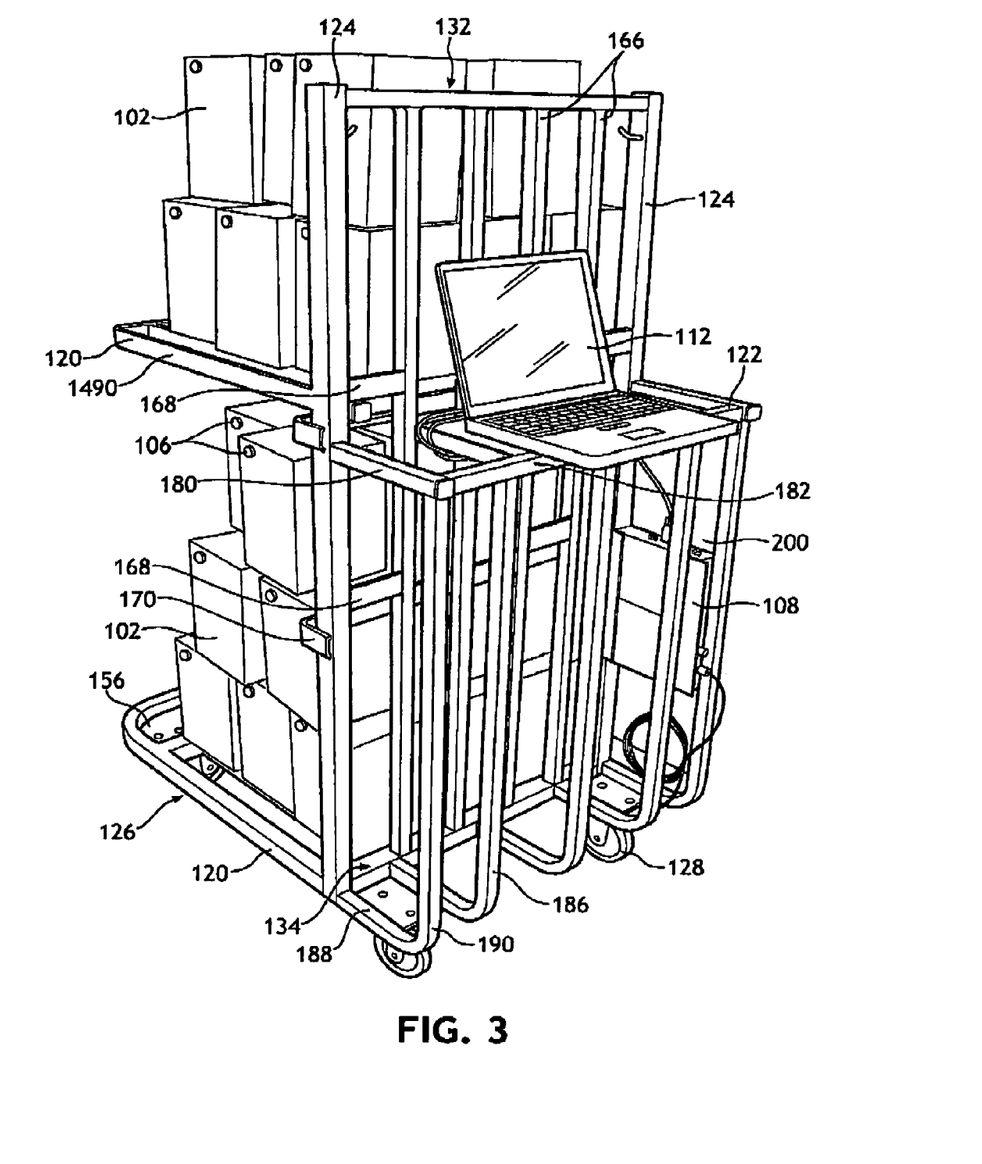
FIG. 3 is a rear perspective view of the exemplary system shown in FIG. 2.

As seen in the embodiment of FIGS. 2 and 3, the transporter 100 may include: a side wall 130, a rear wall 132, and a storage space 134. An additional side wall is contemplated. However, walls are not critical to the present invention. Each wall may serve several purposes, including but not limited to: (a) supporting the carrier(s) disposed onto the platform so that they do not inadvertently fall off during transport; (b) acting as a signal barrier to prevent stray, external data-signals (with respect to transporter 100) from reaching the data tag reader 108; and (c) provide structure for easier manipulation of the transporter 100. Storage space 134 may be used to protect electronic equipment such as data tag reader 108 or to stow items that are handy to have when transporting and placing carriers 102 and/or articles 104.

Still referring to FIGS. 2-3, transporter 100 includes a substantially horizontal bottom platform 120 which operates as a base 140. Base 140 may be constructed from a frame 146 having a front region 148 and a rear region 150. Frame 146 may be constructed from metal tube stock that is formed into a "U" shape as generally defined by a pair of side members 149 and a leading member 151. Side members 149 and leading member 151 may be connected by a joint that is squared, angled or radiused, e.g. radius 155a. A front support member 152 laterally bridges the span between side members 149 near the front region 148, and a rear support member 154 laterally bridges the span between side members 149 at the rear region 150. It is contemplated that frame 146 may be constructed from separate components rather than from a unitary part, and may have a closed configuration such as a rectangle.

To form a surface on which carriers 102 may be disposed, a series of slats 160 may bridge the span between rear support member 154 and front support member 152 as shown, or side members 149 (configuration not shown). One skilled in the art will recognize that slats 160 could be attached to frame 146 at other angles, or be replaced by a solid or mesh material. Support members 152, 154 and slats 160 may be constructed from tube stock or other materials with adequate strength and stiffness characteristics.

The area between leading member 151 and front support member 152 may include a floor piece 156. Together, the leading member 151, front support member 152 and floor piece 156 define a tray that can hold items such as an antenna 110. Floor piece 156 may be constructed from a solid sheet of material such as aluminum alloy or other metals, wood, plastics or composite materials. Floor 156 may instead be a mesh or apertured material (not shown) to prevent dirt from collecting in the tray. However, the solid sheet material may aid in deflecting stray RFID signals. In the alternative, floor piece 156 may be omitted.

A second substantially horizontal platform 120 may be spaced apart vertically from base 140. Like base 140, the upper platform 120 may have a frame that is U-shaped and defined by a pair of side members 149a and a leading edge 151. In the embodiment shown, side members 149a are shorter than side members 149. As such, the base corner radius 155 may be greater than that of platform corner radius 155a because the platform 120 does not extend outwardly beyond the base 140. Though the side members 149a may be shorter than the base side members, the side members 149a extend outwardly beyond the rear support 158 to function as cantilever supports. The extension 159 is slip fitted at the rear wall between a brace 168 and a bar 170, as described below. Like the base, a set of slats 160 span the distance between the leading edge 151 and the rear support 158 (or between sides 149a) to form a surface on which carriers may be disposed.

It is contemplated that more or less than two platforms 120 may be included on the transporter 100. In addition, each platform may include a tray similar to that formed with floor piece 156 in base 140.

The upwardly-facing surface of slats 160 and side members 149/149a may be flush as shown. In the alternative, the upwardly-facing surface of slats 160 may be recessed below the frame 146 to provide a seat for carrier(s) 102. One skilled in the art will realize that the platforms 120(140) may be constructed out of any flat, smooth, or textured surface; or any solid, mesh, or otherwise apertured sheet or components that together form a surface.

A rear wall 132 extends upwardly from the base 140 and may be positioned vertically with respect thereto. In particular, a pair of upright supports 124 are attached to the rear region of the base 140 at the side members 149. Supports 124 may be attached to an upper surface of side members, or an end of the side members. If the latter construction is selected, then the rear support member 154 may extend between the supports 124 than the side members 149, as was previously described.

A bridge 162 spans the distance between the supports 124 for added stability. The bridge 162 may be at the very top of supports 124 as a cap, or just below the top of supports 124 as shown. Supports 124 need not be the same height, and bridge 162 need not be horizontal.

As with the base 140, a series of elongated members are placed in the frame (as defined by the base 140 or rear support member 152, bridge 162, and supports 124) namely, stud members 166. Among other functions, stud members 166 can add support to the transporter, help prevent carriers 102 from sliding off the platforms 120, and aid in preventing stray signals from entering or leaving transporter 100. Stud members 166 may be oriented at any angle, or may be oriented vertically as shown. Further, stud members 166 may be evenly spaced and span the distance between the bridge 162 and base 140.

Additional braces 168 may span a distance between two stud members 168 at structurally strategic places. In particular, braces 168 may be used to support the platform 120, and one or more optional bars 170 may be attached to rear wall 132 to act as a support for platform 120. As mentioned previously, extension 159 is slip fitted between a brace 168 and bar 170.

It is contemplated that platforms may be permanently attached to transporter 100, or selectively attached to transporter 100 by brackets, clips, pins, rails, or the like. Optionally, platform 120 may be selectively raised or lowered on rear wall 132.

In one embodiment, a side wall 130 extends upwardly from base 140 and may be positioned vertically with respect thereto. Like rear wall 142, side wall 130 has opposite sides: an inner side 142, and an outward side (not shown). Side wall 130 may be configured similarly to rear wall 142, with a pair of support members 124, one shared with the rear wall to form a corner 172, and one extending upwardly from frame 146 at the transporter front region 148. A bridge 162 could similarly be placed between the upright supports. In the alternative, as shown in FIG. 2, an L-shaped member may replace the front support member and bridge. The L-shaped member is defined by an upright support 124a that is integrally connected to a top beam 174 with a radiused corner 176. By the term "integrally connected," it is meant that the support 124a and beam 174 have a one-piece construction. As with the rear wall, a plurality of spaced-apart stud members 166 may be span the distance between the beam 174 and base 140. A side brace 178 may be attached on the inner or outer surface of side wall 130 to provide additional structural stability to transporter 100.

A corresponding support member 171 may be placed along side wall, possibly at support 124a, to selectively engage and support the front portion of platform 120. The support member 171 may be a pin that is mounted vertically in a spaced manner on support 124a, at about the same level as a bar 170. Support member 171 hooks the underside of platform 120. Along with providing some support, the support member 171 prevents the platform from inadvertently sliding out from between the brace 168 and bar 170. It is contemplated that other supports or locks may be use instead of member 171.

Referring now to FIG. 3, the computer shelf 122, storage space 134 and data tag reader 108 are most easily viewed. In one embodiment, the optional computer shelf 122 is a platform that extends outwardly from the outer side 144 of rear wall 132. At this location, the shelf is out of the way of the carriers 102 as carriers are loaded and unloaded from transporter 100. A laptop or other computing/data collection device, generically referred to as a computer 112, may be mounted onto the shelf 122. In the alternative, the computer 112 may be mounted directly to the rear wall 132 or other part of the transporter, or even built into a structural member such as support 124. As with the platforms 120, shelf 122 may be constructed from a frame having side handles 180 and a front handle bar 182 spanning the distance between the side handles. The handles 180 and handle bar 182 provide a structure by which the user may easily push the cart. For convenience, the shelf 122 may be located near the waist or hip level of the average user for easy data entry.

In one embodiment, the computer shelf 122 is supported by one or more L-shaped bars 184 that are connected at one end to the underside of the shelf 122 and at the opposite end at the base 140. In particular, each bar 184 has an upper member 186 connected at a normal angle to a lower member 188 by a radius 190. Of course, one skilled in the art will appreciate that the bars 184 could be omitted or replaced by sheet materials, angle brackets, or the like. However, the bars 184 as shown in FIG. 3 form a storage space 134 for various items, which can provide some protection for any electronics stored therein such as data tag reader 108.

Data tag reader 108 may be stored in the storage area 134. However, data tag reader could be stored at another location on transporter 100, integrated or combined with the computer 112, or built within a structural support member, e.g.

member 124. As shown, a plate 200 is connected between the outermost bar 184 adjacent the side wall 130, and the corner defined by support 124. Plate 200 provides a sturdy protective surface on which to mount a data tag reader. As electronic devices become smaller and more durable, such protection and mounting space may not be needed.

The transporter may be constructed from many types of materials, including wood, metal, plastics, composite materials or a combination thereof. The transporter 100 shown in FIGS. 2-3 is constructed of metal, in particular an aluminum alloy having a relatively high strength-to-weight ratio. To further increase the strength and stability of the transporter components, the platforms and walls may be constructed from tube stock. However, one skilled in the art will realize that the platform, walls and other such components may be formed from solid sheets of material such as plywood, reinforced metal sheeting, glass-fiber composites or any material exhibiting the strength and stiffness needed to support the various carriers 102 to be transported.

Carrier 102 may be a platform, wrap, tape, container, label, magnet, tray, corrugated box, or any type of item that can be associated with non-tagged articles. In one embodiment, the carrier 102 is a traditional corrugated box containing a plurality of articles 102, the articles being boxes of consumable goods. It is further contemplated that the carrier 102 may be as simple as a magnet that connects two or more articles 104 together before they are separated, and perhaps, placed on a shelf for sale or inventory. The data tags 106, described herein, are associated with the carrier 102. In the embodiments shown in FIGS. 1-3 the data tags 106 are RFID labels.

A data tag 106 is disposed on each carrier 102. The data tag reader 104 reads or scans the data tag 106 on carrier 102 as it moves past data tag reader 108, or in particular, the antenna or antennae 110 in communication with data tag reader 108. In one embodiment, movement of the carrier 102 is such that the carrier 102 is within a desired range of the data tag reader 104 to provide adequate time for effective reading of the signal. For example, if the data tag reader 104 detects a weak signal with significant noise or interference, the article may need to be placed more closely to the data tag reader 104 to allow the it to detect the data tag 106. Depending on the size and configuration of transporter 100, along with the environment in which it is used, more than one antenna 110 may be required and strategically placed on transporter 100. Further, more than one data-tag reader 108 may be required.

In an alternative embodiment, the transporter 100 may be physically associated with a confirmation sensor (not shown) such as a vision system, video camera, load cell, for sensing the presence of articles 104 or carriers 102 on transporter 100. The purpose of the confirmation sensor is to backup or confirm the information entered into the computer 112 by a user. For example, the number of articles 102 that are permanently removed from the carriers 102 may be confirmed using the confirmation sensor. One application would be in a retail setting, whereby the user removes several articles 104 of a known weight from a carrier 102. In one embodiment, the quantity of removed articles 104 and/or the quantity of remaining articles 102 on transporter 100 may be calculated by weight. In another embodiment, the quantity of articles 104 removed from transporter 100 may be counted visually. Regardless, the user entry into computer 112 can be confirmed by the additional information regarding weight or visual count.

In another embodiment, the transporter 100 may include a data tag that is connected to or otherwise associated with a GPS device that emits a signal indicating its location which can be read by the data tag reader 108 or another device (not shown) cooperatively associated with the data tag reader 104. In this manner, the location of a transporter 100 and/or the carrier(s) 102 can be tracked within a defined environment.

It is contemplated that the user of transporter 100 is a robot (not shown) such as a robotic arm connected to the transporter 100. One example of a robotic arm that could be used in conjunction with a transporter 100 is a MITSUBISHI PA10 Robotic Arm. It is further contemplated that the computer may provide a map to the user to indicate where articles 104 should be placed. In addition, the transporter 100 may be automatically guided by a program on the computer or another database.

Method

One embodiment of the method of the present invention can be practiced with a system as shown in FIGS. 1-3. In general, described is a computer-implemented method for determining the location of a non-data-tagged article within a defined environment. A transporter 100 as described herein is loaded with at least one carrier 102, also described herein. Carrier 102 has a data tag 106 associated therewith. Further associated with the carrier 102 is at least one article 102 that does not include a data tag 106. Article 102 may be any tangible good, ranging from a material or part to be implemented in a manufacturing setting, to a product to be placed on a retail shelf. As a non-limiting example, the method of the invention will be described in a retail setting. However, it is contemplated that the method may be used in a factory, museum, farm, automobile dealership, or any setting where articles are received and inventoried. In particular, the method may be utilized as part of a KAIZAN or KANBAN function at a manufacturing plant.

In one embodiment, each carrier 102 is placed onto or removed from the transporter 100, the antenna 110 detects a signal from the data tag 106, and transmits the signal to the data tag reader 108. The data tag reader 108 in turn transmits a signal to the computer 112. (As mentioned, the data tag reader 108 may be physically located in the same housing as the computer components.) The data tag may provide the following information to the computer 112: weight of carrier 102/articles 104, article SKU or other identifying information, and the like.

In one embodiment, after the carrier 102 disposition is transmitted to computer 112, it is further transmitted to a database. The database may be a local drive on the computer 112, or be another computing or data receiving device located at a distance from the computer. Such transmissions may occur wirelessly, as by a modem or other data line. The transmission may be automatically performed by the computer 112, or may be transmitted manually by the user. A "manual" transmission may be performed by a user viewing or hearing information from the computer 112, and relaying this information to another party by telephone, facsimile, electronic mail or the like. The location of the transporter 100 may be similarly transmitted to a remote data base, and location information may be supplied by a GPS device as is known in the art.

In one embodiment, the quantity of articles 104 are removed from carrier(s) 102 and tallied either (a) as each removal occurs, or (b) after a particular event. An event may be the emptying of a carrier 102, the emptying of all carriers 102 containing the same article type, the emptying of all carriers 102 on a platform 120 or transporter 100, or the return of a carrier 102 to a warehouse or alternate storage.

Other events may be defined by the user. As an example, a first carrier 102 containing ten articles such as facial tissue is placed onto transporter 100. The user empties all ten articles 104 from the first carrier 102. The user inputs into the computer 112 the fact that ten articles were disassociated or removed from container 102, and either throws the carrier away or returns it to transporter 100. The user takes a second carrier 102 containing ten boxes of facial tissue from transporter 100. The user removes only five of the articles 104 from carrier 102, and returns the carrier to transporter 100. All removed articles may be disposed by the user to a storage space such as a retail store shelf. User then inputs the fact that five articles were removed from the second carrier. The information regarding how many articles 014 are on the transporter 100 is known and may be transmitted to a remote database. In the alternative or in addition to the previous step, the user may input the fact that five articles 102 were placed in a storage space. Information regarding the location of or how many such articles 102 are located at the storage space may further be inputted into the computer and transmitted to a database.

In another embodiment, information regarding the types of carriers 102 and number of articles 104 associated therewith is stored on the computer 112. As a carrier 102 is disposed onto transporter 100, the antenna 110/data tag reader 108 detects the data tag 106 on the carrier. The data tag reader 108 transmits this information to the computer 112. A display on computer 112 may indicate the type of article 104 that is in carrier 102. This information is obtained from codes embedded in the data tag 106. The user may, in a user defined interval, input into the computer the number of articles 102 removed from transporter 100. The user may further input into the computer the type of articles 102 removed from transporter 100. The user may use an additional device such as a bar code scanner to input this information as each article 102 is removed from the carrier 102, or after a group of articles have been removed from carrier 102. This information is transmitted to a database, such as a network or server. The computer may display known information about the carrier 102, such as how many articles 104 are left within the carrier. The computer may also display the number of articles removed from transporter 100.

In one embodiment, a load cell (not shown) on transporter 100 detects the weight of the carriers 102 in transporter 100. The known information regarding the items on transporter 100 includes the weight of the carriers 102 and/or articles 104. The weight reading from the load cell may be transmitted to the computer and displayed. The computer may compare the weight data against the information inputted by user to verify the accuracy of the user input. Likewise, in one embodiment, a camera could record the number of articles 100 that are removed from transporter for verification purposes.

In yet another embodiment, the location of articles 102, once removed from transporter 100 may be recorded and/or input into computer 112 for transmittal to a database. In another retail store example, the user may use a computer voice recognition program. The user may indicate that "X" number of articles 104 from a certain carrier 102 is placed on Aisle "Y." In the alternative, a GPS on transporter 100 may transmit the location data to computer 112, and a program may automatically associate that data to any input from the user so that the user does not need to input location information. In another alternative, the storage area, e.g. store shelf, may have an unique location identifier that a bar code scanner may detect. The user may bar scan the shelf and the computer programmed to associate that information with the number of articles 102 place on the shelf.

In one embodiment, information such as date, time, number, location, and initial status of carriers 102 may be input into the computer 112 by the user as the transporter is initially loaded. Further, the transporter 100 may pass a data tag reader portal so that the time the transporter 100 passes into another area is known. This information may be transmitted to a database that is separate from or located with computer 112. The transporter 100 is taken to another area in the defined environment for disposal of articles 104. Once the disposal of articles 104 is complete, the transporter may once again pass through the data tag reader portal so that the time at which the transporter 100 returns from another area is recorded. As the user removes carriers 102 from transporter 100, the information such as time, number, location, and final status of carriers 102 may be input into the computer 112 by the user. All data collected by the computer from the time it was initially loaded with carriers 102 to the time it was unloaded may be transmitted to a database.

The invention is operable with any form of computer or computing device known in the art. A user may enter commands and information into the computing device through input devices or user interface selection devices well known in the art such as a keyboard and a pointing device (e.g., a mouse, trackball, pen, or touch pad).

The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The invention may include the computing device itself when programmed according to the methods and techniques described herein.

The invention may be practiced in distributed computing environments where tasks are performed by remote processing devices that are linked through a communications network. In a distributed computing environment, program modules may be located in both local and remote computer storage media including memory storage devices.

It is to be understood that many other technologies are potential substitutes for the RFID embodiments disclosed herein. For example, RFID readers could be replaced with optical scanners, image analysis devices, arrays of chemical detection devices, and the like to allow other technologies for reading identification means to be applied.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an identification code, then transforms it to another radio signal that is emitted by the smart tag and read by a scanner. The identification code of the smart tag is extracted from the radio signal. RFSAW, Inc. (Dallas, Tex.) also provides minute Surface Acoustic Wave (SAW) RFID devices that may be used within the scope of the present invention.

Another related technology is ultra-wide band (UWB) technology. UWB technology permits wireless communication between objects using low-power electromagnetic transmissions. However, receivers and transmitters generally are both active but use very low power, typically less than that of radio frequency noise, relying on intermittent pulses which cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer-implemented method for determining the location of an article within a defined environment, said computer-implemented method comprising the steps of:
providing a transporter comprising a mobile platform and a data tag reader adapted to interrogate a tagged carrier, the data tag reader interfaced to a computer;
disposing a tagged carrier onto the transporter, the tagged carrier associated with at least one non-tagged article;
disassociating at least one non-tagged article from the tagged carrier and communicating said dissociation to the computer, wherein said dissociation is verified by a confirmation sensor.

2. The computer-implemented method of claim 1 further comprising the step of communicating the step of disposing the tagged carrier onto the transporter to the computer.

3. The computer-implemented method of claim 2 further comprising the step of transmitting the occurrence of disposing the tagged carrier onto the transporter to a database.

4. The computer-implemented method of claim 1 further comprising the steps of:
removing the tagged carrier from the transporter; and
communicating the step of removing the tagged carrier to the computer.

5. The computer-implemented method of claim 4 further comprising the step of transmitting the occurrence of removing the tagged carrier from the transporter to a database.

6. The computer-implemented method of claim 5 further comprising the step of transmitting the location of the tagged carrier to a database after removing the tagged carrier from the transporter.

7. The computer-implemented method of claim 1 wherein the step of communicating said dissociation is manual.

8. The computer-implemented method of claim 1 further including the step of disposing the non-tagged article to a storage space after disassociating the at least one non-tagged article from the tagged carrier.

9. The computer-implemented method of claim 8 wherein the storage space is a retail store.

10. The computer-implemented method of claim 8 further including the step of transmitting the location of the at least one non-tagged article to a database.

11. The computer-implemented method of claim 1 further including the step of interrogating the tagged carrier with the data tag reader and transmitting information about the carrier to the computer.

12. A computer-implemented method for determining the location of an article within a retail system selling consumer products, said computer-implemented method comprising the steps of:
providing a transporter comprising a mobile platform and a data tag reader interfaced to a computer database;
disposing a tagged carrier onto the transporter, the tagged carrier associated with at least one non-tagged article;
interrogating the tagged carrier with the data tag reader and transmitting carrier data to the computer;
disassociating one of the at least one non-tagged articles from the tagged carrier and communicating said dissociation to the computer; and
communicating to the computer the location of all non-tagged articles disassociated from the transporter, wherein said communication step automatic.

13. The computer-implemented method of claim 12 further comprising: communicating the step of disposing a tagged carrier onto the transporter to the computer.

14. The computer-implemented method of claim 13 further comprising the step of transmitting the occurrence of disposing the tagged carrier onto the transporter to a database.

15. The computer-implemented method of claim 13 further comprising the steps of:
removing the tagged carrier from the transporter; and
communicating the removal of the tagged carrier to the computer.

16. A system for location of an article within a defined setting, the system comprising:
- a transporter with compartments adapted to separate and carry RFID-tagged containers containing non-RFID-tagged articles;
- a reader attached to the transporter for communicating electronic RFID data to a computer; at least one antenna configured to receive and transmit data for each compartment to the computer via the reader;
- wherein the computer determines and transmits data regarding the location of the non-RFID-tagged articles and the tagged containers, and disassociation of the non-RFID-tagged articles from the tagged containers, to a database; and
- a confirmation sensor for verifying the disassociation.

17. The system of claim 16 wherein the transporter further comprises a load cell to weigh the RFID-tagged carriers.

* * * * *